US009325095B2

(12) United States Patent
Glick et al.

(10) Patent No.: US 9,325,095 B2
(45) Date of Patent: Apr. 26, 2016

(54) FEMALE TYPE CONTACT FOR AN ELECTRICAL CONNECTOR

(75) Inventors: Michael Glick, Farmington Hills, MI (US); Slobodan Pavlovic, Novi, MI (US); Allen Leo Mott, Livonia, MI (US); Tulasi Sadras-Ravindra, Canton, MI (US)

(73) Assignee: Lear Corporation, Southfield, MI (US)

( * ) Notice: Subject to any disclaimer, the term of this patent is extended or adjusted under 35 U.S.C. 154(b) by 228 days.

(21) Appl. No.: 13/181,030

(22) Filed: Jul. 12, 2011

(65) Prior Publication Data

US 2013/0017739 A1    Jan. 17, 2013

Related U.S. Application Data

(63) Continuation-in-part of application No. 13/101,592, filed on May 5, 2011, now Pat. No. 8,876,562.

(51) Int. Cl.
*H01R 13/11* (2006.01)
*H01R 13/187* (2006.01)

(52) U.S. Cl.
CPC .................. *H01R 13/187* (2013.01)

(58) Field of Classification Search
CPC ..... H01R 13/187; H01R 13/111; H01R 43/26
USPC .................................. 439/839–858
See application file for complete search history.

(56) References Cited

U.S. PATENT DOCUMENTS

| 2,912,668 | A |   | 11/1959 | Eddy |  |
|---|---|---|---|---|---|
| 3,003,135 | A | * | 10/1961 | Purinton | 439/843 |
| 3,059,208 | A | * | 10/1962 | Concelman | 439/381 |
| 3,161,451 | A |   | 12/1964 | Neidecker |  |
| 3,564,487 | A | * | 2/1971 | Upstone et al. | 439/843 |
| 3,784,965 | A |   | 1/1974 | Murphy |  |
| 3,815,081 | A | * | 6/1974 | Jones | 439/747 |
| 3,861,776 | A | * | 1/1975 | Deal | 439/434 |
| 4,002,400 | A |   | 1/1977 | Evans |  |
| 4,359,258 | A | * | 11/1982 | Palecek et al. | 439/741 |
| 4,401,359 | A |   | 8/1983 | Frelk |  |
| 4,447,110 | A | * | 5/1984 | Punako et al. | 439/843 |
| 4,461,530 | A | * | 7/1984 | Brush et al. | 439/843 |
| 4,461,531 | A | * | 7/1984 | Davis | H01R 43/26 439/843 |

(Continued)

FOREIGN PATENT DOCUMENTS

CH          151479       12/1931
CN      201005663 Y      1/2008

(Continued)

OTHER PUBLICATIONS

International Search Report, Application No. PCT/US2012/036518, filed May 4, 2012, Dated Aug. 6, 2012.

(Continued)

*Primary Examiner* — Briggitte R Hammond
(74) *Attorney, Agent, or Firm* — MacMillan, Sobaski & Todd, LLC (57) ABSTRACT

A female contact is provided for an electrical connector. The female contact includes a body portion and a plurality of flexible beams that extend from the body portion. The body portion is biased for engagement with a connector housing. The flexible beams taper from a first width this is near the body portion to a second width that is smaller than the first width.

18 Claims, 6 Drawing Sheets

(56) References Cited

U.S. PATENT DOCUMENTS

| | | | | |
|---|---|---|---|---|
| 4,508,413 | A | 4/1985 | Bailey | |
| 4,572,606 | A | 2/1986 | Neumann et al. | |
| 4,585,295 | A * | 4/1986 | Ackerman | 439/857 |
| 4,621,887 | A * | 11/1986 | Piscitelli et al. | 439/843 |
| 4,714,441 | A | 12/1987 | Corman | |
| 4,728,304 | A * | 3/1988 | Fischer | 439/842 |
| 4,734,063 | A | 3/1988 | Koch et al. | |
| 4,734,064 | A | 3/1988 | Knapp et al. | |
| 4,780,097 | A * | 10/1988 | Piscitelli | 439/843 |
| 4,826,144 | A | 5/1989 | Balsells | |
| 4,934,967 | A | 6/1990 | Marks et al. | |
| 5,046,952 | A * | 9/1991 | Cohen et al. | 439/63 |
| 5,106,328 | A | 4/1992 | Prochaska et al. | |
| 5,139,276 | A | 8/1992 | Balsells | |
| 5,147,221 | A * | 9/1992 | Cull et al. | 439/585 |
| 5,203,813 | A | 4/1993 | Fitzsimmons et al. | |
| 5,358,224 | A | 10/1994 | Balsells | |
| 5,362,244 | A * | 11/1994 | Hanson et al. | 439/82 |
| 5,376,012 | A | 12/1994 | Clark | |
| 5,419,723 | A * | 5/1995 | Villiers et al. | 439/843 |
| 5,449,304 | A | 9/1995 | Huss, Jr. et al. | |
| 5,474,309 | A | 12/1995 | Balsells | |
| 5,474,479 | A | 12/1995 | Bennett et al. | |
| 5,482,476 | A | 1/1996 | Watanabe et al. | |
| 5,486,123 | A * | 1/1996 | Miyazaki | 439/825 |
| 5,509,814 | A * | 4/1996 | Mosquera | 439/82 |
| 5,588,852 | A | 12/1996 | Puerner | |
| 5,591,039 | A | 1/1997 | Matthews | |
| 5,599,027 | A | 2/1997 | Balsells | |
| 5,658,175 | A | 8/1997 | Muzslay | |
| 5,667,413 | A | 9/1997 | Trafton | |
| 5,676,571 | A | 10/1997 | Matthews | |
| 5,730,628 | A * | 3/1998 | Hawkins | 439/843 |
| 5,735,716 | A | 4/1998 | Bilezikjian | |
| 5,816,643 | A | 10/1998 | Itou et al. | |
| 5,897,404 | A * | 4/1999 | Goodman | H01R 13/187 439/843 |
| 5,921,803 | A | 7/1999 | Mori | |
| 5,938,487 | A | 8/1999 | Henry et al. | |
| 6,039,614 | A | 3/2000 | Ramari | |
| 6,042,432 | A * | 3/2000 | Hashizawa et al. | 439/843 |
| 6,062,919 | A | 5/2000 | Trafton | |
| 6,102,746 | A | 8/2000 | Nania et al. | |
| 6,102,751 | A | 8/2000 | Becker | |
| 6,186,841 | B1 | 2/2001 | Jacobsson | |
| 6,190,215 | B1 * | 2/2001 | Pendleton et al. | 439/853 |
| 6,250,974 | B1 | 6/2001 | Kerek | |
| 6,254,439 | B1 | 7/2001 | Endo et al. | |
| 6,264,508 | B1 | 7/2001 | Lehmann | |
| 6,273,766 | B1 | 8/2001 | Zennamo, Jr. et al. | |
| 6,296,970 | B1 | 10/2001 | Killebrew et al. | |
| 6,328,615 | B1 * | 12/2001 | Safai | 439/851 |
| 6,464,546 | B2 | 10/2002 | LaCoy | |
| 6,475,039 | B1 | 11/2002 | Despouys | |
| 6,482,049 | B1 | 11/2002 | Swearingen | |
| 6,590,478 | B2 * | 7/2003 | Pluymers | 333/246 |
| 6,752,668 | B2 | 6/2004 | Koch, Jr. | |
| 6,811,453 | B2 | 11/2004 | Williams | |
| 6,835,084 | B2 | 12/2004 | Poon et al. | |
| 6,837,756 | B2 | 1/2005 | Swearingen et al. | |
| 6,848,922 | B2 | 2/2005 | Coughlan et al. | |
| 6,899,571 | B1 | 5/2005 | Koch et al. | |
| 6,966,802 | B2 | 11/2005 | Hielscher et al. | |
| 6,969,220 | B2 * | 11/2005 | Anquetin | 411/38 |
| 7,048,596 | B2 | 5/2006 | Swearingen et al. | |
| 7,191,518 | B2 | 3/2007 | Beloritsky et al. | |
| 7,393,252 | B2 | 7/2008 | Ribeau et al. | |
| 7,828,609 | B2 | 11/2010 | Li et al. | |
| 7,845,992 | B2 | 12/2010 | Glick et al. | |
| 7,892,050 | B2 | 2/2011 | Pavlovic et al. | |
| 7,909,236 | B2 | 3/2011 | Erdie | |
| 8,282,429 | B2 | 10/2012 | Glick et al. | |
| 8,414,339 | B1 | 4/2013 | Glick et al. | |
| 8,425,253 | B2 | 4/2013 | Malloy et al. | |
| 8,430,698 | B2 | 4/2013 | Stewart et al. | |
| 2002/0055305 | A1 | 5/2002 | Williams | |
| 2002/0122690 | A1 | 9/2002 | Poon et al. | |
| 2003/0040228 | A1 | 2/2003 | Finzer et al. | |
| 2003/0077950 | A1 | 4/2003 | Swearingen et al. | |
| 2004/0245686 | A1 | 12/2004 | Balsells | |
| 2005/0242910 | A1 | 11/2005 | Balsells | |
| 2007/0190868 | A1 | 8/2007 | De Cloet et al. | |
| 2008/0246231 | A1 | 10/2008 | Sjostedt et al. | |
| 2008/0254670 | A1 | 10/2008 | Balsells et al. | |
| 2008/0255631 | A1 | 10/2008 | Sjostedt et al. | |
| 2009/0048638 | A1 | 2/2009 | Rey et al. | |
| 2009/0258519 | A1 | 10/2009 | Dilmaghanian et al. | |
| 2009/0298356 | A1 | 12/2009 | Li et al. | |
| 2010/0029127 | A1 | 2/2010 | Sjostedt | |
| 2010/0029145 | A1 | 2/2010 | Balsells et al. | |
| 2010/0279558 | A1 | 11/2010 | Leon et al. | |
| 2010/0311266 | A1 | 12/2010 | Dilmaghanian et al. | |
| 2011/0034053 | A1 | 2/2011 | Matsumoto et al. | |
| 2011/0171850 | A1 | 7/2011 | Brown, II | |
| 2012/0000329 | A1 | 1/2012 | Glick | |
| 2012/0003880 | A1 | 1/2012 | Glick et al. | |
| 2012/0003882 | A1 | 1/2012 | Stewart et al. | |
| 2012/0003883 | A1 | 1/2012 | Pavlovic et al. | |
| 2012/0282797 | A1 | 11/2012 | Mott et al. | |
| 2012/0282823 | A1 | 11/2012 | Glick et al. | |
| 2012/0322322 | A1 | 12/2012 | Stewart et al. | |
| 2013/0017739 | A1 | 1/2013 | Glick et al. | |
| 2013/0052854 | A1 | 2/2013 | Mott et al. | |
| 2013/0109221 | A1 | 5/2013 | Glick et al. | |
| 2013/0109237 | A1 | 5/2013 | Glick et al. | |
| 2013/0337702 | A1 | 12/2013 | Pavlovic et al. | |

FOREIGN PATENT DOCUMENTS

| | | |
|---|---|---|
| DE | 19836196 A1 | 2/1999 |
| DE | 19943373 A1 | 3/2000 |
| DE | 102004002403 B3 | 7/2005 |
| FR | 997233 A | 1/1952 |
| JP | 2007317403 A | 12/2007 |
| WO | 2010060370 A1 | 6/2010 |

OTHER PUBLICATIONS

Written Opinion of the International Search Authority, Application No. PCT/US2012/036518, filed May 4, 2012, Dated Aug. 6, 2012.

Chinese Office Action, Application No. 201280021920.0, dated Jul. 20, 2015.

"SAE Electric Vehicle and Plug in Hybrid Electric Vehicle Conductive Charge Coupler", Surface Vehicle Recommended Practice, J1772 Jan. 2010, SAE International, Issued Oct. 1996, Revised Jan. 2010.

International Search Report and Written Opinion for corresponding Application No. PCT/US2012/036559, mailed Aug. 6, 2012, 2 pages.

International Preliminary Report for corresponding Application No. PCT/US2012/036559, mailed Apr. 1, 2014, 6 pages.

* cited by examiner

FEMALE TYPE CONTACT FOR AN ELECTRICAL CONNECTOR

CROSS-REFERENCE TO RELATED APPLICATIONS

This application claims the benefit of U.S. application Ser. No. 13/101,592 filed May 5, 2011, the disclosure of which is incorporated herein by reference.

BACKGROUND OF THE INVENTION

This invention relates in general to a female contact for an electrical connector that can be used, for example, to connect a battery in an electric vehicle to a source of electrical energy. In particular, this invention relates to an improved structure for such a female contact that provides for increased durability and current carrying capacity, while simplifying the production and assembly thereof.

Electric and hybrid electric vehicles are typically propelled by an electric motor that draws current from an on-board battery. In order to maintain a sufficient amount of electrical energy in the battery to operate the electric motor, it is usually desirable to connect the battery to a source of electrical energy and thereby replenish the amount of electrical energy stored therein. To facilitate this, it is known to provide respective electrical charging connectors on both the vehicle and the source of electrical energy. The electrical charging connectors cooperate with one another so that the source of electrical energy can be quickly and easily connected to and removed from the vehicle to facilitate recharging of the battery for subsequent use by the electric motor.

In some instances, the electrical charging connectors provided on the vehicle and the source of electrical energy includes respective male and female electrical connectors. Typically, the male electrical connectors includes one or more protruding portions that are sized and shaped to be received within respective receptacle portions provided on the female electrical connectors. A wide variety of these male and female electrical connectors are known in the art. Generally speaking, the female electrical connector includes a cylindrical housing having a female contact secured therein. The female contact may include a body portion and a plurality of flexible beams that extend axially therefrom. The flexible beams are angled inwardly from the body portion so as to receive and frictionally engage an outer surface of the male electrical connector when inserted therein.

It is known that the current carrying capacity of the assembly of the male and female electrical connectors is related to both the electrical conductivity of the material used to form the connectors and the magnitude of the engagement force exerted therebetween. To establish good electrical conductivity, it is common to form electrical contacts from copper. However, the magnitude of the engagement force exerted by copper can be undesirably reduced as a result of increased temperatures (caused by heat generated by the flow of electricity therethrough) and fatigue (caused by repetitive deflection of the beams due to repeated use). Thus, it would be desirable to provide an improved structure for a female contact that provides for increased durability and current carrying capacity, yet which is relatively simple and inexpensive to manufacture.

SUMMARY OF THE INVENTION

This invention relates to an improved structure for a female contact for an electrical connector. The female contact includes a body portion and a plurality of flexible beams that extend from the body portion. The body portion is biased for engagement with a connector housing. The flexible beams taper from a first width this is near the body portion to a second width that is smaller than the first width.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
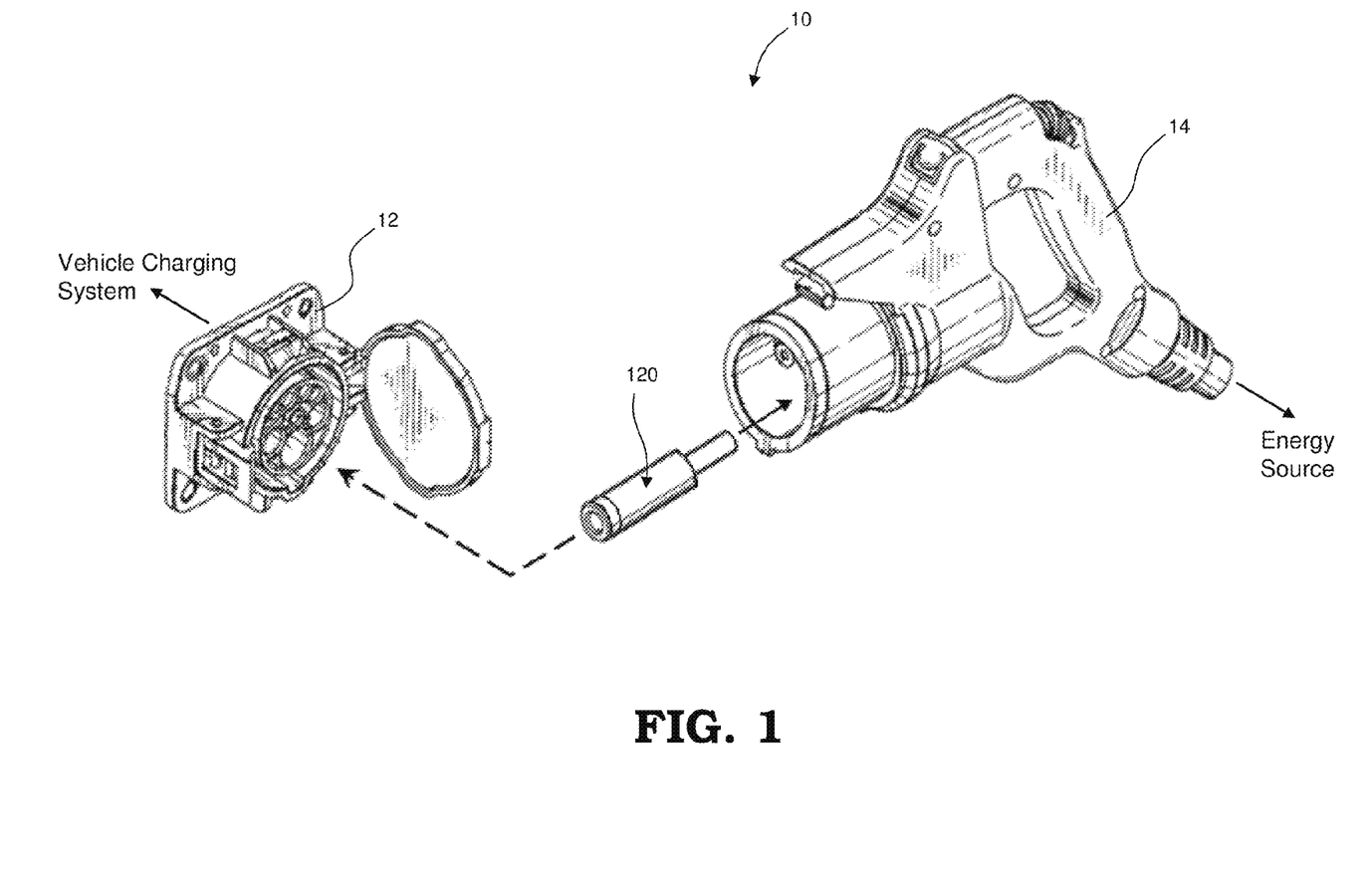
FIG. 1 is an exploded perspective view of portions of an electrical charging system that can be used, for example, to electrically connect a battery in an electric vehicle to a source of electrical energy for recharging.

Referring now to the drawings, there is illustrated in FIG. 1 portions of an electrical charging system, indicated generally at 10, in accordance with this invention. As will be explained below, the electrical charging system 10 can be used, for example, to electrically connect a battery (not shown) in an electric vehicle to a source of electrical energy (not shown) for recharging. However, the illustrated electrical charging system 10 is intended merely to illustrate one environment in which this invention may be used. Thus, the scope of this invention is not intended to be limited for use with the specific structure for the electrical charging system 10 illustrated in FIG. 1 or with electrical charging systems in general. It should be appreciated that this invention may be used in any desired environment and for any desired purpose.

The illustrated electrical charging system 10 includes a first charging connector 12 and a second charging connector 14. The first charging connector 12 can, for example, be provided on a vehicle (not shown) and form a portion of a conventional charging system for a battery within the vehicle. The second charging connector 14 can, for example, be provided on a source of electrical power (not shown) and form a portion of a conventional charging station for use with the charging system within the vehicle. In the illustrated embodiment, the first charging connector 12 includes a male electrical connector (not shown), while the second charging connector 14 includes a female electrical connector, indicated generally at 120. However, if desired, the first charging connector may alternatively include the female electrical connector 120, while the second charging connector 14 may include the male electrical connector.

FIGS. 2 through 5 illustrate a first embodiment of the female electrical connector 120 in accordance with this invention. As shown, the female electrical connector 120 includes a housing that is indicated generally at 130. The illustrated housing 130 is a generally cylindrical structure, although such is not required. For example, the housing 130 may alternatively have any desired shape, such as a polygonal shape. The housing 130 is preferably formed from a generally rigid and electrically conductive material, such as a metal for example, but may be formed from any other material. If desired, an outer layer of an electrically non-conductive material (not shown) may be provided about the housing 130.

Figure 2:
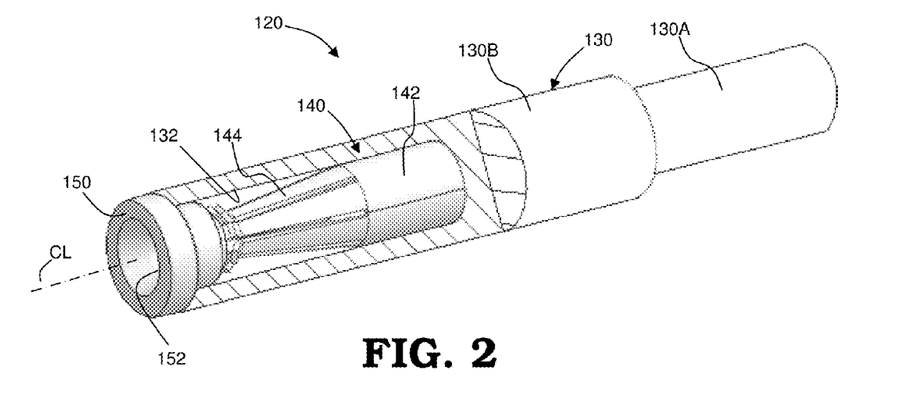
FIG. 2 is a perspective view, partially in cross section, of a first embodiment of an electrical connector for the electrical charging system illustrated in FIG. 1.
Figure 3:
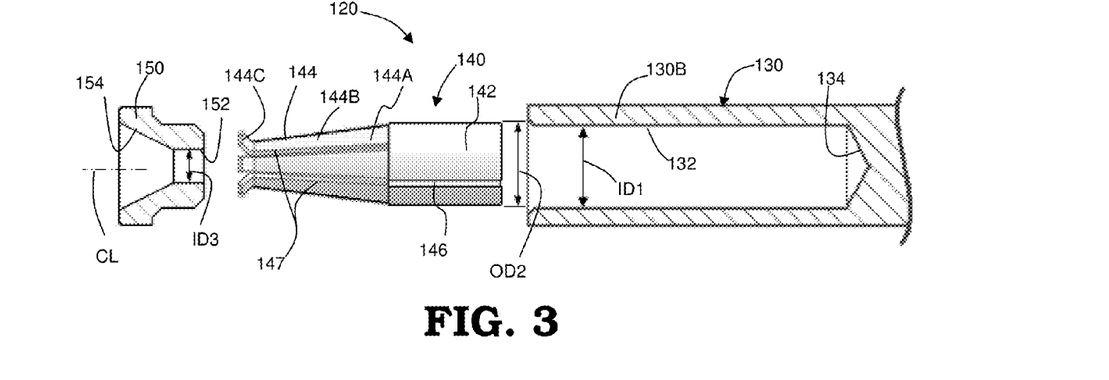
FIG. 3 is an exploded side elevational view, partially in cross section, of the electrical connector illustrated in FIG. 2.

The illustrated housing 130 includes a first housing portion 130A and a second housing portion 130B, the purposes of which will be explained below. The first and second housing portions 130A, 130B can be integrally formed as a single component or may alternatively be two or more separate components that are secured together. Further, the illustrated first and second housing portions 130A, 130B are co-axially aligned along a centerline CL, although such is not required.

The first housing portion 130A is configured to electrically connect the female electrical connector 120 to the source of electrical energy. For example, the first housing portion 130A may define an aperture (not shown) that extends into an end portion thereof. The aperture can be adapted to receive a lead wire (not shown) that is connected the source of electrical energy. The lead wire may be secured within the aperture by a soldering, crimping, or other process. Alternatively, the first housing portion 130A can be connected to the source of electrical energy using a fastener arrangement if so desired. The first housing portion 130A may define any other structural features for a desired application.

The second housing portion 130B is configured to receive and frictionally engage the male electrical connector. To accomplish this, the second housing portion 130B may define a bore 132 that extends into an end portion thereof. Thus, the illustrated second housing portion 130B has an open end where the bore 132 is provided and a closed end defined by a back wall 134. Further, it should be appreciated that the cylindrical wall of the second housing portion 130B may be any thickness for a desired application. The second housing portion 130B will be further described below.

The illustrated female electrical connector 120 also includes a female contact or electrical terminal, indicated generally at 140, that is disposed within the bore 132. The female contact 140 is a cylindrical structure that includes a body portion 142 and a plurality of flexible beams 144 extending therefrom. As shown, an outer cylindrical surface of the body portion 142 is adapted to frictionally engage an inner cylindrical wall of the bore 132 defined by the second housing portion 130B. Engagement between the body portion 142 and the second housing portion 130B secures the female contact 140 within the bore 132 and establishes electrical continuity between the female contact 140 and the housing 130. Insertion of the female contact 140 within the second housing portion 130B will be further explained below. Alternative ways of securing the female contact 140 within the second housing portion 130B will also be described and illustrated below.

The illustrated female electrical connector 120 also includes an optional end piece 150. The end piece 150 can be secured to the open end of the second housing portion 130B. The illustrated end piece 150 has a thru-hole 152 that is configured to receive the male electrical connector. The end piece 150 is preferably formed from an electrically non-conductive material, such as a plastic or the like, but may be formed from any desired material. The end piece 150 will be described in further detail below.

FIG. 3 shows the components of the female electrical connector 120 prior to assembly. As described above, the bore 132 is formed in the second housing portion 130B so as to define an open end. If desired, a chamfer can be provided around the outer and/or inner edges of the open end, although such is not required. The back wall 134 can be a generally flat surface or may define a conical shape that is formed by a cutting tool (not shown) used to machine the bore 132. The bore 132 has an inner diameter ID1 that is configured to receive the female contact 140 as will be explained below. It should be appreciated that the bore 132 can be any size and/or shape for a desired application.

The illustrated female contact 140 can be produced from a sheet of resiliently flexible material that is cut and subsequently shaped to form the cylindrical body portion 142 and the flexible beams 144, as will be further explained below. In doing so, opposite edges of the sheet are brought together in an opposing fashion to form a gap 146. The gap 146 axially extends along an entire length of the body portion 142, although such is not required. The circumferential width of the gap 142 can be selectively adjusted by flexing a cross section of the body portion 142 from a relaxed or biased position (i.e. expanded) to a deflected position (i.e. contracted). As such, an outer diameter OD2 of the body portion 142 can be adjustable with relative ease. The relaxed outer diameter OD2 of the body portion 142 is slightly larger than the inner diameter ID1 of the bore 132 prior to the female contact 140 being inserted into the bore 132. The gap 146 enables the outer diameter OD2 of the body portion 142 to be temporarily reduced to facilitate the insertion of the female contact 140 into the bore 132, as will be explained below.

The illustrated flexible beams 144 axially extend from the body portion 142 along the centerline CL and are angled inwardly relative to the body portion 142. Axially extending spaces 147 are defined between adjacent ones of the plurality of flexible beams 144. In the illustrated embodiment, the flexible beams 144 are integrally formed with the body portion 142. However, the flexible beams 144 can be separate members that are attached to the body portion 142 in any manner.

Figure 4:
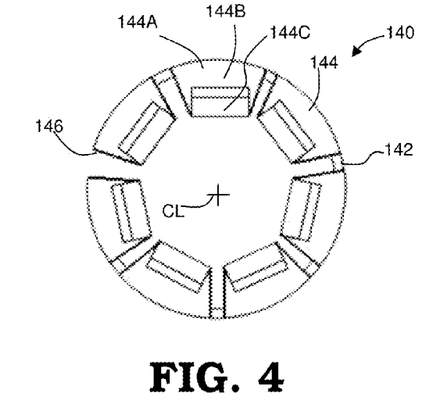
FIG. 4 is an end elevational view of a portion of a female type contact for the electrical connector illustrated in FIGS. 2 and 3.

As shown in FIGS. 3 and 4, each of the illustrated flexible beams 144 includes a base portion 144A, an intermediate portion 144B, and a tip portion 144C. The base portion 144A extends from the body portion 142 and can define a curvature along its width that generally corresponds with the cylindrical shape of the body portion 142. The intermediate portion 144B extends between the base portion 144A and the tip portion 144C. In the illustrated embodiment, the intermediate portion 144B tapers from a larger circumferential width near the base portion 144A to a smaller circumferential width near the tip portion 144C. As a result, each of the illustrated axially extending spaces 147 that are defined between adjacent ones of the respective flexible beams 144 has a constant width along the axial lengths thereof. The tip portion 144C extends from the intermediate portion 144B. The tip portion 144C may be angled relative to the intermediate portion 144B so as to radially extend outwardly from the centerline CL. The tip portion 144C will be further described below.

As mentioned above, the illustrated end piece 150 defines a thru-hole 152 that is configured to receive the male electrical connector for insertion into the female electrical connector 120. Thus, the thru-hole 152 may define a predetermined inner diameter ID3. It will be appreciated that the inner diameter ID3 of the thru-hole 152 can be any size or shape for a desired application. The illustrated end piece 150 also includes a tapered portion 154, although such is not required. The tapered portion 154 is configured to properly align the male electrical connector with the female electrical connector 120 prior to being inserted therein. The illustrated tapered portion 154 axially extends from an open extremity of the end piece 150 to the inner diameter ID3 of the thru-hole 152. The tapered portion 154 may be angled relative to the thru-hole 152 and can extend any axial length into the end piece 150 for a desired application.

Assembly of the female electrical connector 120 will now be described. Initially, the body portion 142 of the female contact 140 has a relaxed outer diameter OD2 that is slightly larger than the inner diameter ID1 of the bore 132. Thus, the outer diameter OD2 of the body portion 142 can be temporarily reduced by deflecting the body portion 142 so as to reduce the circumferential width of the gap 146 that is defined between the opposing edges thereof. The gap 146 can define an initial circumferential width that allows the body portion 142 to deflect a sufficient amount for insertion into the bore 132 without exceeding the elastic limits of the selected material, which would otherwise cause permanent deformation. The female contact 140 is then inserted into the bore 132 of the second housing portion 130B.

The resiliency of the material causes the body portion 142 to spring back or otherwise expand. As a result, the outer surface of the body portion 142 is biased for frictional engagement with the inner surface of the bore 132. The resultant engagement secures the female contact 140 within the housing 130 and provides electrical continuity therebetween. The female contact 140 may also be secured within the housing 130 by an adhesive, a welded connection, or any other desired manner. Alternative embodiments for securing the female contact 140 within the housing 130 and establishing electrical continuity therebetween will be described and illustrated below, which may also be incorporated into the first embodiment described herein.

Once the female contact 140 is secured within the second housing portion 130B, the end piece 150 can be secured to the open end of the housing 130. For example, the end piece 150 may define an outer portion that is configured to frictionally engage the inner diameter ID 1 of the bore 132 to form a press-fit connection. Alternatively (or in addition), the end piece 150 can be secured to the open end of the housing 130 by an adhesive, a threaded connection, a welded connection, or in any other manner.

As shown in FIGS. 3 and 4, the flexible beams 144 radially extend inwardly from the body portion 142 toward the centerline CL when in a relaxed or biased position. Conversely, the tip portions 144C extend outwardly away from the centerline CL. As a result, the tip portions 144C form an expandable eyelet having a crown or tulip arrangement that is configured to receive and frictionally engage an outer surface of the male electrical connector (not shown). The illustrated tip portions 144C define generally flat or planar surfaces across their width, although the tip portions 144C may define curved surfaces that correspond with the outer diameter of the male electrical connector or any other surface contour if so desired. It should be appreciated, however, that the tip portions 144C may have any shape or be arranged in any other manner.

The inner surfaces of the tip portions 144C combine to form an inner diameter that is slightly smaller than the outer diameter of the desired male electrical connector. As the male electrical connector is inserted into the female electrical connector 120, the male electrical connector initially engages the tip portions 144C. As a result, the flexible beams 144 are pivoted outwardly away from the centerline CL. Thus, it should be appreciated that the amount of force required to fully insert the male electrical connector within the female electrical connector 120 (i.e. insertion force) can be adjusted by varying the angular relationship of the tips 144C relative to the centerline CL. For example, a larger angular relationship defined between the tip portions 144C and the centerline CL results in a higher insertion force.

A normal force is applied to each of the respective flexible beams 144 by the male electrical connector when it is received within the female electrical connector 120. The normal force acts on each respective flexible beam 144 in a radial direction away from the centerline CL. Thus, it should be apparent that the normal force is equal to an amount of spring force that the respective flexible beam 144 exerts on the outer surface of the male electrical connector (i.e. opposite the normal force).

It is generally known that an increase in spring force may increase the current carrying capacity of the female electrical connector 120. The spring force of each respective flexible beam 144 can be determined by the selection of material that is used to form the female contact 140 and/or by adjusting the dimensions (i.e. length, width, thickness, etc.) of the flexible beams 144. However, as described above the size of the female electrical connector 120 is generally limited. As such, simply increasing the dimensions of the flexible beams 144 to increase the spring force is not a practical option. It should become apparent that the illustrated flexible beams 144 of this invention can provide for increased current carrying capacity and improved durability of the female electrical connector 120.

For example, the illustrated tapered width of the flexible beam 144 can distribute the bending stresses more evenly along the length of the beam which, in turn, can reduce the stresses that are typically concentrated at the base portion 144A thereof. A reduction in concentrated stresses at the base portion 144A may result in reduced fatigue and, therefore, a lower failure rate due to repetitive bending. As such, the female contact 140 may be formed from a material that has good conductive properties, such as copper for example.

In addition, a reduction in concentrated stresses at the base portion 144A may also enable the female contact 140 to be formed from a thinner sheet of material. A thinner sheet of material can allow for an increased number of flexible beams 144 to be used in the female electrical connector 120 of relatively limited size. For example, the illustrated female contact 140 includes seven flexible beams 144 that are equally spaced apart from one another. However, in other non-illustrated embodiments, the female contact 140 can include any number of flexible beams 144 capable of being incorporated as described herein. For example, the female contact 140 may include less than seven beams, such as four, five or six beams, or more than seven beams, such as ten, eleven, twelve, or more beams as permitted by size of the female electrical connector 120. An increased number of flexible beams 144 results in an increased number of contact points which, in turn, can provide increased current carrying capacity for a female electrical connector 120 of relatively limited size. As such, the female contact 140 may alternatively be formed from a material having lower conductive properties with increased strength if so desired, such as a copper clad alloy for example. It should be appreciated that the female contact 140 can be optimized by balancing the spring force and the number of the flexible beams 144 in relation to the current carrying capacity requirements for a particular application.

Figure 5:
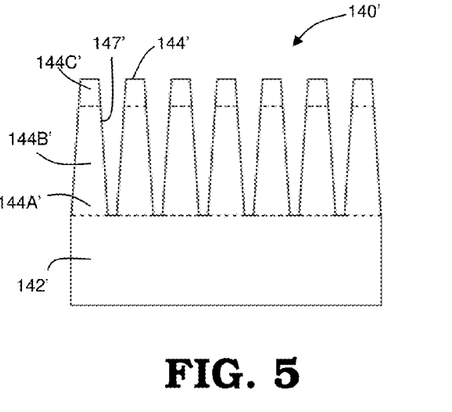
FIG. 5 is a top plan view of a sheet of material that can be used to form the female type contact illustrated in FIGS. 2, 3, and 4.

Referring now to FIG. 5, there is illustrated a sheet of material 140' that can be used to form the female contact 140. The sheet 140' can be any generally resilient material that is electrically conductive, such as for example a copper or a copper clad alloy. The sheet 140' may be stamped or otherwise cut to define an outline of the female contact 140. The stamped sheet 140' may then be shaped to define the illustrated female contact 140, as shown in FIGS. 2 through 4. For example, the sheet 140' can be shaped using a roll forming, bending, or any other suitable process. In particular, opposite edges of the sheet 140' are brought together in an opposing manner to form a cylindrical structure. It should be appreciated that the sheet 140' may be any thickness for a desired application. Further, the sheet 140' may have a constant thickness throughout or, alternatively, can have a varying thickness to achieve desired spring forces in the body portion 142 and/or the flexible beams 144.

As shown, the sheet 140' includes a body portion 142' and a plurality of flexible beams 144' that extend therefrom. The body portion 142' may include any apertures, tabs, or other features for a desired application. Each of the flexible beams 144' has a base portion 144A', an intermediate portion 144B', and a tip portion 144C'. The tip portions 144C' of the flexible beams 144' may be folded or otherwise bent along the corresponding dashed line. Similarly, the flexible beams 144' can be folded along the corresponding dashed line that is positioned at the base portions 144A' thereof. It should be appreciated that indentation lines or the like may be provided along the illustrated dashed lines to control the location and accuracy of the bends and to assist in forming the female contact 140.

FIGS. 6 through 9 illustrate a second embodiment of a female electrical connector, indicated generally at 220, in accordance with this invention. The female electrical connector 220 may include any structural features as described and illustrated above in the first embodiment, although such is not required. Similar features have been numbered with common reference numerals but have been increased to 200 (i.e. 220, 230, 240, etc.). It should be appreciated that similar features are structured similarly, operate similarly, and/or have the same function unless otherwise indicated by the drawings or this specification.

Figure 6:
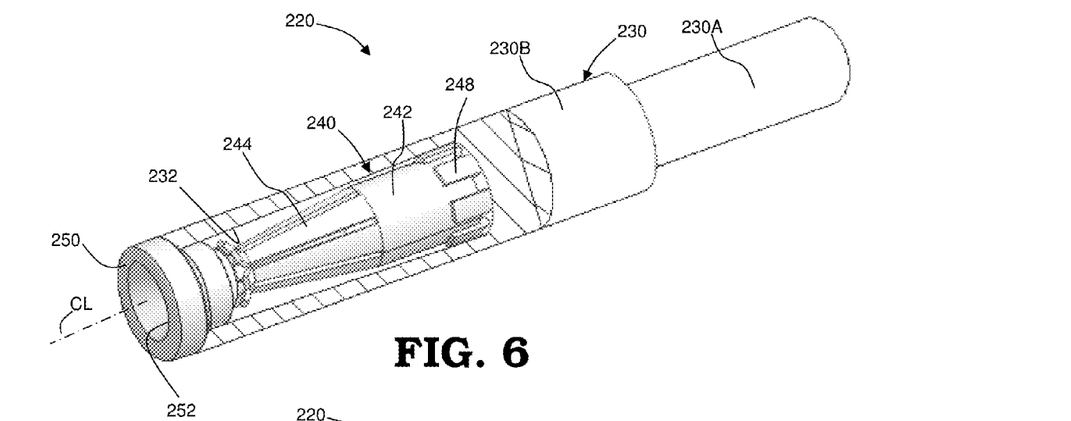
FIG. 6 is a perspective view, partially in cross section, of a second embodiment of an electrical connector for the electrical charging system illustrated in FIG. 1.
Figure 7:
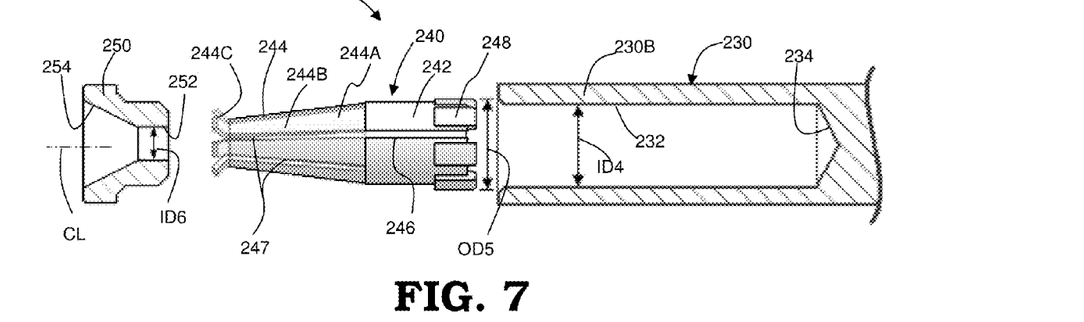
FIG. 7 is an exploded side elevational view, partially in cross section, of the electrical connector illustrated in FIG. 6.
Figure 8:
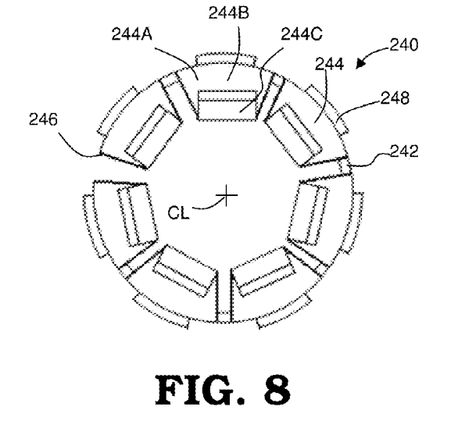
FIG. 8 is an end elevational view of a portion of a female type contact for the electrical connector illustrated in FIGS. 6 and 7.
Figure 9:
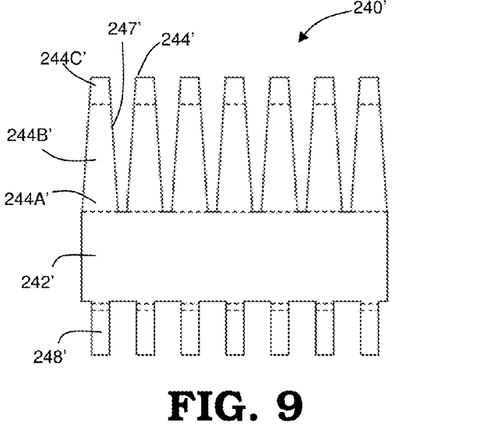
FIG. 9 is a top plan view of a sheet of material that can be used to form the female type contact illustrated in FIGS. 6, 7, and 8.

For example, the illustrated female electrical connector 220 includes a housing 230, a female contact 240, and an end piece 250. The housing 230 and the end piece 250 can be similarly embodied as described above in the first embodiment or may be otherwise configured as desired.

The illustrated female contact 240 includes a body portion 242 and a plurality of flexible beams 244 extending therefrom. The body portion 242 and the flexible beams 244 can be similarly embodied as described above in the first embodiment. However, in the illustrated embodiment the female contact 240 further includes a plurality of tabs 248 that are located along an outer surface of the body portion 242. For example, the tabs 248 can be integrally formed with the female contact 240 from a sheet of material. The tabs 248 are then folded over so as to extend along and engage the outer surface of the body portion 242.

One purpose of the tabs 248 is to secure the female contact 240 within the housing 230, as will be explained below. As such, the tabs 248 are configured to frictionally engage the inner surfaces of a bore 232 formed in the housing 230 when the female contact 240 is inserted therein. The tabs 248 can provide increased contact stresses with the inner surface of the housing 230 as compared to the first embodiment. As a result of the increased contact stresses, the tabs 248 may also provide for improved electrical continuity between the female contact 240 and the housing 230. It should be appreciated that the female contact 240 may include any number, shape, or configuration of tabs 248 for a desired application.

Assembly of the female electrical connector 220 will now be described. As shown, the tabs 248 of the body portion 242 initially define an outer diameter OD5 that is slightly larger than an inner diameter ID4 of the bore 232. Thus, the outer diameter OD5 defined by the tabs 248 can be temporarily reduced by deflecting the body portion 242 and minimizing or otherwise closing a gap 246 that extends along the body portion 242. The female contact 240 is then inserted into the bore 232 of the housing 230.

The resiliency of the selected material causes the body portion 242 to spring back or otherwise expand. As a result, the outer surfaces of the tabs 248 are biased for frictional engagement with the inner surface of the bore 232. The resultant engagement secures the female contact 240 within the housing 230 and provides electrical continuity therebetween. It should be appreciated that the female contact 240 may also be secured within the housing 230 by an adhesive, a welding process, or any other desired manner.

Once the female contact 240 is secured within housing 230, the end piece 250 can be secured to the open end of the housing 230. For example, the end piece 250 may define an outer portion that is configured to frictionally engage the inner diameter ID4 of the bore 232 to form a press-fit connection. Alternatively (or in addition), the end piece 250 can be secured to the open end of the housing 230 by an adhesive, a threaded connection, a welded connection, or in any other manner.

Referring now to FIGS. 10 through 13, there is illustrated a third embodiment of a female electrical connector, indicated generally at 320, in accordance with this invention. The female electrical connector 320 may include any structural features as described and illustrated above in the previous embodiments, although such is not required. Similar features have been numbered with common reference numerals but have been increased to 300 (i.e. 320, 330, 340, etc.). It should be appreciated that similar features are structured similarly, operate similarly, and/or have the same function unless otherwise indicated by the drawings or this specification.

Figure 10:
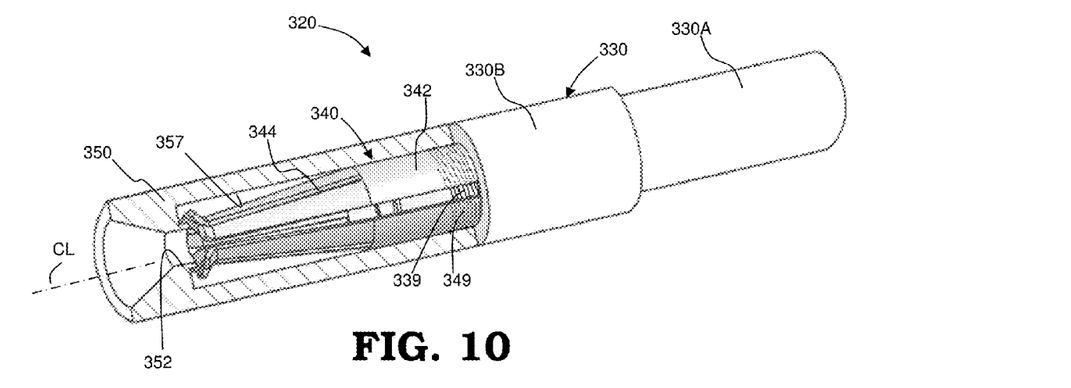
FIG. 10 is a perspective view, partially in cross section, of a third embodiment of an electrical connector for the electrical charging system illustrated in FIG. 1.
Figure 11:
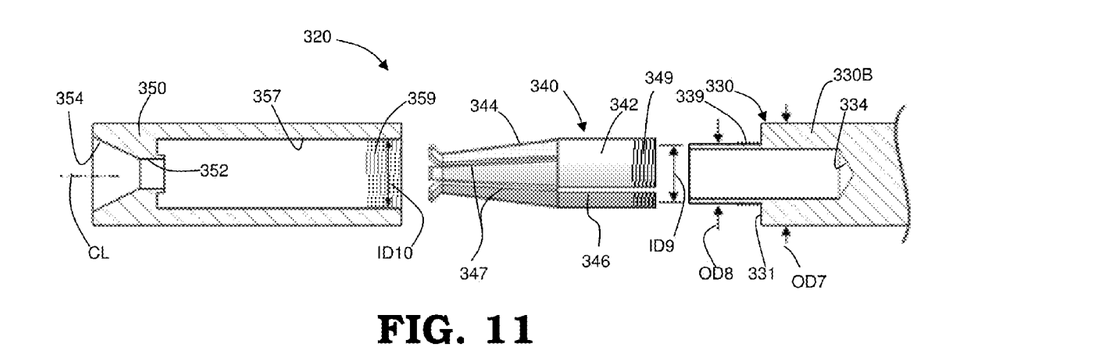
FIG. 11 is an exploded side elevational view, partially in cross section, of the electrical connector illustrated in FIG. 10.
Figure 12:
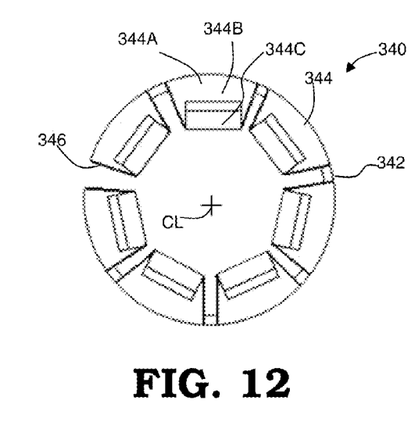
FIG. 12 is an end elevational view of a portion of a female type contact for the electrical connector illustrated in FIGS. 10 and 11.
Figure 13:
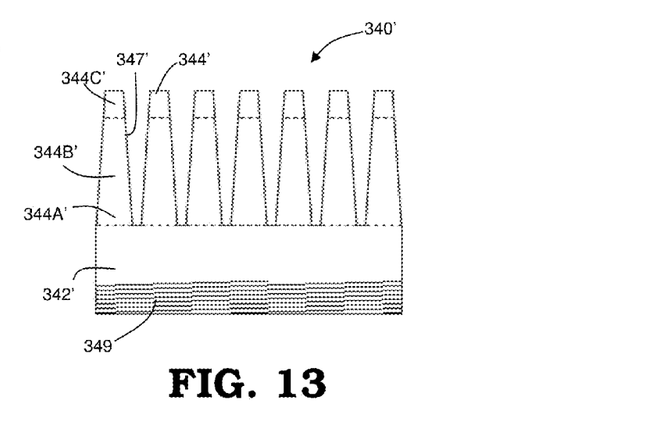
FIG. 13 is a top plan view of a sheet of material that can be used to form the female type contact illustrated in FIGS. 10, 11, and 12.

The illustrated female electrical connector 320 includes a housing 330, a female contact 340, and an end-piece 350. The illustrated housing 330 includes a first housing portion 330A and a second housing portion 330B. However, the second housing portion 330B defines a first outer diameter OD7 and a second outer diameter OD8. The second outer diameter OD8 is smaller than the first outer diameter OD7 thereby forming a shoulder 331. The illustrated second housing portion 330B also includes a threaded section 339, although such is not required. The threaded section 339 can be an external thread located along any desired length of the second outer diameter OD8. The purposes of the second outer diameter OD8, the shoulder 331, and the threaded section 339 will be explained below.

The illustrated female contact 340 includes a body portion 342 and a plurality of flexible beams 344 that extend therefrom. The body portion 342 and the flexible beams 344 can be similarly embodied as described above in the previous embodiments. For example, the body portion 342 can define a generally cylindrical structure having a gap 346 defined between two opposing edges thereof. Accordingly, the body portion 342 defines an inner diameter ID9. Initially, the inner diameter ID9 is slightly smaller than the second outer diameter OD8 of the housing 330, the purpose of which will be explained below. The illustrated body portion 342 also includes a threaded section 349, although such is not required. The threaded section 349 can be an internal thread and/or an external thread and extend along any length of the body portion 342. As will be explained below, the threaded section 349 of the body portion 342 is configured to engage the threaded section 339 of the second housing portion 330B.

As shown, the end piece 350 includes a thru-hole 352 and a tapered portion 354 as described above in the previous embodiments. However, the illustrated end piece 350 also includes an elongated cylindrical portion that defines a bore 357 extending therethrough. The bore 357 has an inner diameter ID10, the purposes of which will be explained below. It should be appreciated that the end piece 350 can be any length or have any wall thickness for a desired application. The illustrated end piece 350 also includes a threaded section 359, although such is not required. The threaded section 359 can be an internal thread located along any length of the bore 357. As will be explained below, the threaded section 359 of the end piece 350 is configured to engage the threaded section 349 of the female contact 340.

Assembly of the female electrical connector 320 will now be described. Initially, the body portion 342 of the female contact 340 is placed over the second outer diameter OD8 of the housing 330. As briefly described above, the body portion 342 of the female contact 340 defines an inner diameter ID9 that is slightly smaller than the second outer diameter OD8 of the housing 330. Thus, the inner diameter ID9 of the body portion 332 can be temporarily expanded by deflecting the body portion 342 and increasing the gap 346 that is located between the opposing edges. This can by accomplished engaging the inner diameter ID9 of the body portion 342 with the second outer diameter OD8 of the housing 330.

The resiliency of the selected material causes the body portion 342 to spring back or otherwise contract. As a result, the inner surface of the body portion 342 frictionally engages the second outer diameter OD8 of the housing 330. The resultant engagement secures the female contact 340 to the housing 330 and establishes electrical continuity therebetween. If provided, the threaded section 349 of the female contact 340 may be screwed into engagement with the threaded section 339 of the housing 330. Alternatively (or in addition), the female contact 340 may be secured to the housing 330 by an adhesive, a welding process, or in any other manner.

Once the female contact 340 is secured to the housing 330, the end piece 350 can be secured over the female contact 340. For example, the inner diameter ID10 of the bore 357 defined by the end piece 350 may be configured to frictionally engage an outer surface of the body portion 342 of the female contact 340 to form a press-fit connection. If provided, the threaded section 359 of the end piece 350 can be screwed into engagement with the threaded section 349 of the female contact 340. Alternatively (or in addition), the end piece 350 can be secured to the female contact 340 or to the housing 330 by an adhesive, a welded connection, or in any other manner. In yet another embodiment, the end piece 350 can be formed from a non-conductive material that is over-molded to the housing 330 and the female contact 340 or otherwise secured thereto.

Referring now to FIGS. 14 through 17, there is illustrated a fourth embodiment of a female electrical connector, indicated generally at 420, in accordance with this invention. The female electrical connector 420 may include any structural features as described and illustrated above in the previous embodiments, although such is not required. Similar features have been numbered with common reference numerals but have been increased to 400 (i.e. 420, 430, 440, etc.). It should be appreciated that similar features are structured similarly, operate similarly, and/or have the same function unless otherwise indicated by the drawings or this specification.

Figure 14:
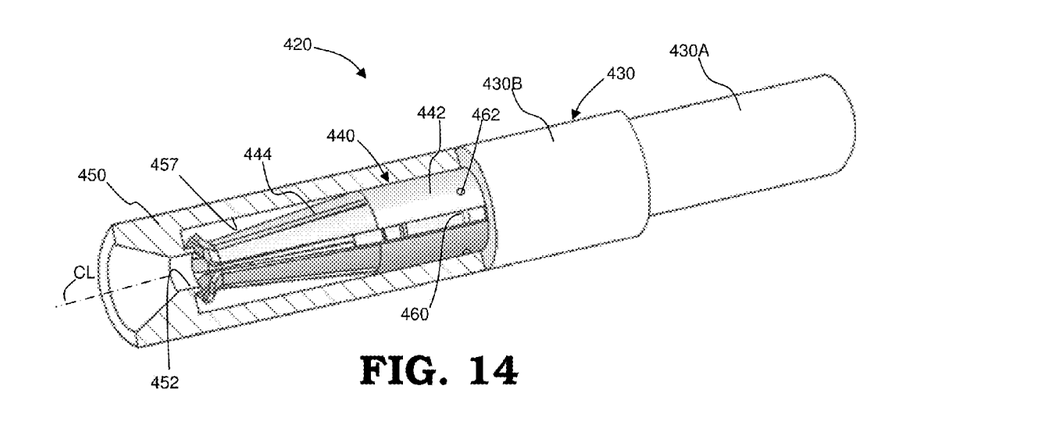
FIG. 14 is a perspective view, partially in cross section, of a fourth embodiment of an electrical connector for the electrical charging system illustrated in FIG. 1.
Figure 15:
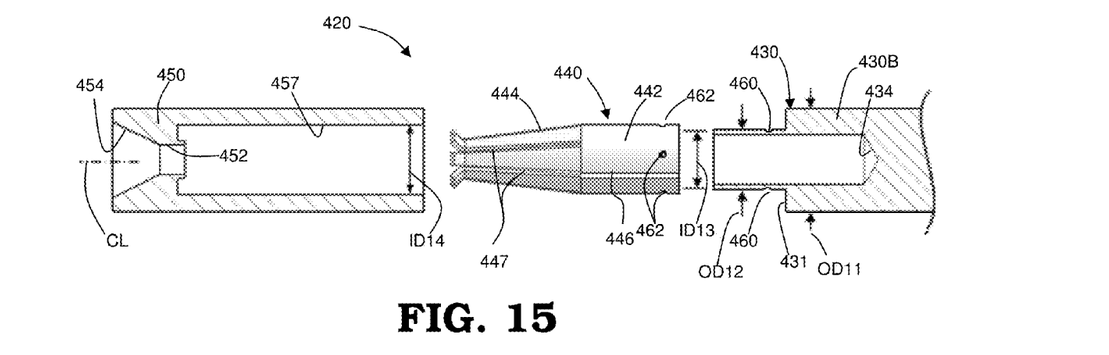
FIG. 15 is an exploded side elevational view, partially in cross section, of the electrical connector illustrated in FIG. 14.

The illustrated female electrical connector 420 includes a housing 430, a female contact 440, and an end-piece 450. The illustrated housing 430 includes a first housing portion 430A and a second housing portion 430B. However, the second housing portion 430B defines a first outer diameter OD11 and a second outer diameter OD12. The second outer diameter OD12 is smaller than the first outer diameter OD11 thereby forming a shoulder 431. The purposes of the second outer diameter OD12 and the shoulder 431 will be explained below.

The illustrated housing 430 further includes a groove 460. As shown, the groove 460 circumferentially extends around an outer surface of the second outer diameter OD12 of the second housing portion 430B. The groove 460 can have any cross-sectional shape, width, or depth as desired. The purposes of the groove 460 will also be explained below.

The illustrated female contact 440 includes a body portion 442 and a plurality of flexible beams 444 that extend therefrom. The body portion 442 and the flexible beams 444 can be similarly embodied as described above in the previous embodiments. For example, the body portion 442 can define a generally cylindrical structure having a gap 446 defined between two opposing edges thereof. Accordingly, the body portion 442 defines an inner diameter ID13. Initially, the inner diameter ID13 is slightly smaller than the second outer diameter OD12 of the housing 430, the purpose of which will be explained below.

Figure 16:
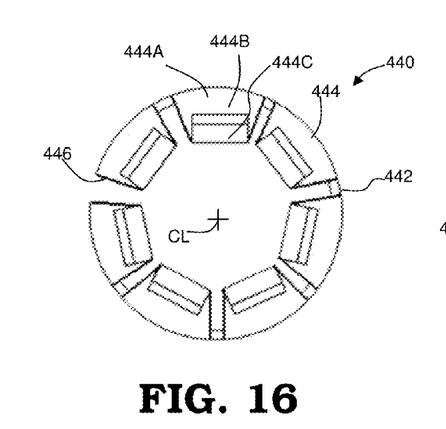
FIG. 16 is an end elevational view of a portion of a female type contact for the electrical connector illustrated in FIGS. 14 and 15.
Figure 17:
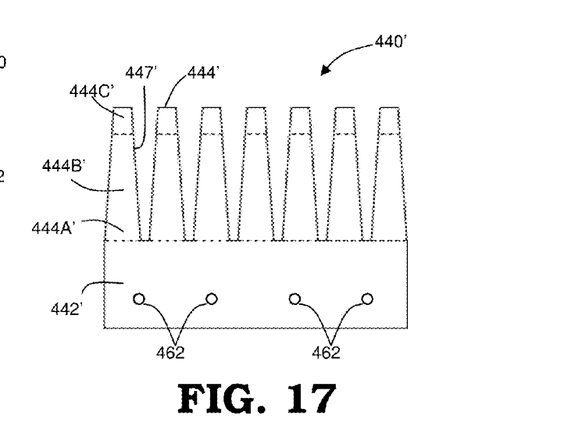
FIG. 17 is a top plan view of a sheet of material that can be used to form the female type contact illustrated in FIGS. 14, 15, and 16.

The female contact 440 further includes a plurality of protrusions 462. The illustrated protrusions 462 are circumferentially spaced apart from one another and extend inwardly from an inner surface of the body portion 442. The protrusions 462 may extend inwardly any distance from the body portion 442. The protrusions 462 can be formed in the sheet of material by a punching process or any other forming process. It should be also appreciated that the female contact 440 may include any number, shape, or configuration of protrusions 462 for a desired application.

As shown, the end piece 450 includes a thru-hole 452 and a tapered portion 454 as described above in the previous embodiments. The illustrated end piece 450 also includes an elongated cylindrical portion that defines a bore 457 extending therethrough. The bore 457 has an inner diameter ID14, the purposes of which will be explained below. It should be appreciated that the end piece 450 can be any length or have any wall thickness wall for a desired application.

Assembly of the female electrical connector 420 will now be described. Initially, the body portion 442 of the female contact 440 is placed over the second outer diameter OD12 of the housing 430. As briefly described above, the body portion 442 of the female contact 440 defines an inner diameter ID13 that is slightly smaller than the second outer diameter OD12 of the housing 430. Thus, the inner diameter ID13 of the body portion 442 can be temporarily expanded by deflecting the body portion 442 and increasing the gap 446 that is located between the opposing edges. This can by accomplished engaging the inner diameter ID13 of the body portion 442 with the second outer diameter OD12 of the housing 430. The female contact 440 is slid along the first housing portion 430B until the protrusions 462 engage the groove 460 that is formed in the second outer diameter OD12.

The resiliency of the selected material causes the body portion 442 to spring back or otherwise contract. As a result, the inner surface of the body portion 442 frictionally engages the second outer diameter OD12 of the housing 430 and the protrusions 462 are disposed within the groove 460. The resultant engagement between the mating components secures the female contact 440 to the housing 430 and establishes electrical continuity therebetween. It should be appreciated that the female contact 440 may also secured to the housing 430 by an adhesive, a welding process, or in any other manner.

Once the female contact 440 is secured to the housing 430, the end piece 450 can be secured over the female contact 440. For example, the inner diameter ID14 of the bore 457 that is defined by the end piece 450 may be configured to frictionally engage an outer surface of the body portion 442 of the female contact 440 to form a press-fit connection. Alternatively (or in addition), the end piece 450 can be secured to the female contact 440 or to the housing 430 by an adhesive, a welded connection, a threaded connection, or in any other manner. In yet another embodiment, the end piece 450 can be formed from a non-conductive material that is over-molded to the housing 430 and the female contact 440 or otherwise secured thereto.

Referring now to FIGS. 18 through 21, there is illustrated a fifth embodiment of a female electrical connector, indicated generally at 520, in accordance with this invention. The female electrical connector 520 may include any structural features as described and illustrated above in the previous embodiments, although such is not required. Similar features have been numbered with common reference numerals but have been increased to 500 (i.e. 520, 530, 540, etc.). It should be appreciated that similar features are structured similarly, operate similarly, and/or have the same function unless otherwise indicated by the drawings or this specification.

Figure 18:
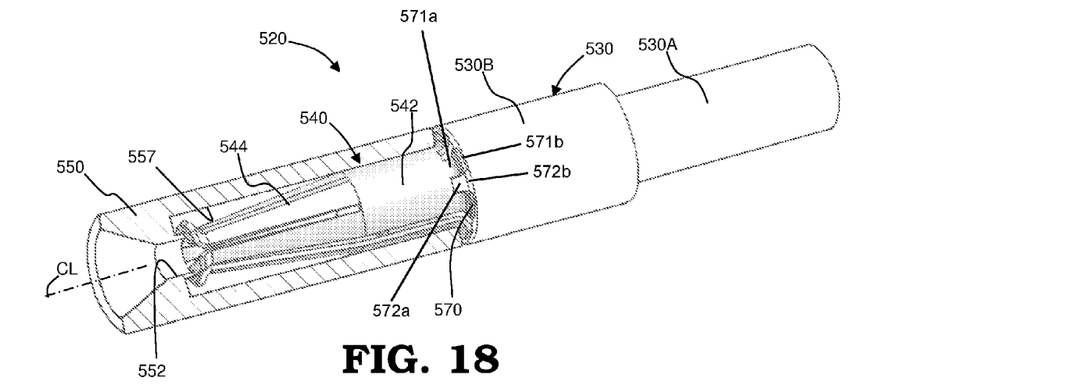
FIG. 18 is a perspective view, partially in cross section, of a fifth embodiment of an electrical connector for the electrical charging system illustrated in FIG. 1.
Figure 19:
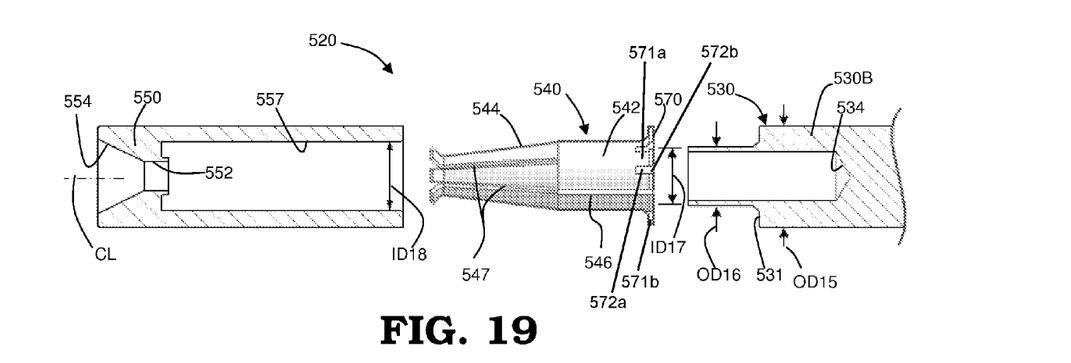
FIG. 19 is an exploded side elevational view, partially in cross section, of the electrical connector illustrated in FIG. 18.
Figure 20:
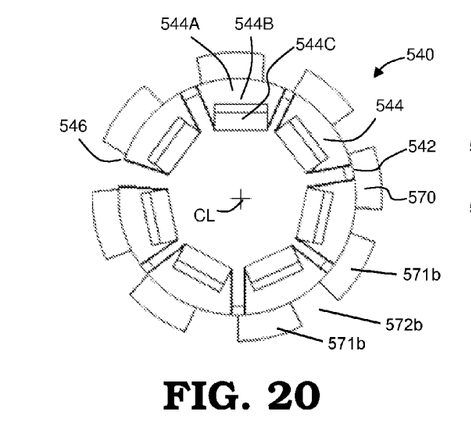
FIG. 20 is an end elevational view of a portion of a female type contact for the electrical connector illustrated in FIGS. 18 and 19.
Figure 21:
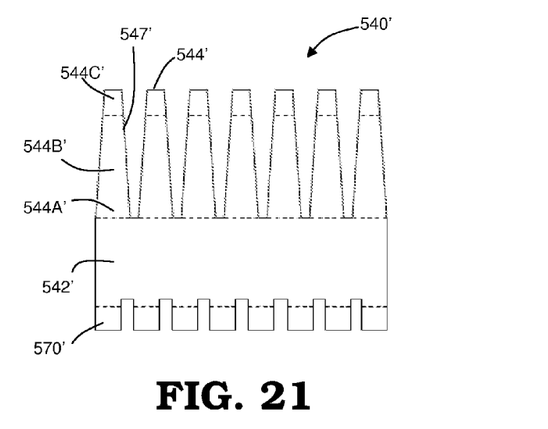
FIG. 21 is a top plan view of a sheet of material that can be used to form the female type contact illustrated in FIGS. 18, 19, and 20.

The illustrated female electrical connector 520 includes a housing 530, a female contact 540, and an end-piece 550. The illustrated housing 530 includes a first housing portion 530A and a second housing portion 530B. However, the second housing portion 530B defines a first outer diameter OD15 and a second outer diameter OD16. The second outer diameter OD16 is smaller than the first outer diameter OD15 thereby forming a shoulder 531. The purposes of the second outer diameter OD16 and the shoulder 531 will be explained below.

The illustrated female contact 540 includes a body portion 542 and a plurality of flexible beams 544 that extend therefrom. The body portion 542 and the flexible beams 544 can be similarly embodied as described above in the previous embodiments. For example, the body portion 542 can define a generally cylindrical structure having a gap 546 defined between two opposing edges thereof. Accordingly, the body portion 542 defines an inner diameter ID17. The inner diameter ID17 is slightly smaller than the second outer diameter OD16 of the housing 530, the purpose of which will be explained below.

The illustrated female contact 540 further includes a plurality of support legs 570. As shown in FIGS. 18 through 21, the support legs 570 are spaced apart from one another and extend outwardly from an edge of the body portion 542. Each support leg 570 includes an axially extending portion 571a and a radially outwardly extending portion 571b. Axially extending spaces 572a are defined between the axially extending portions 571a of adjacent support legs 570 and radially extending spaces 572b are defined between the radially outwardly extending portions 571b of adjacent support legs 570. The support legs 570 may extend any distance from the body portion 542. The support legs 570 can be integrally formed with the female contact 540 from the sheet of material and subsequently folded as described above in the previous embodiments. Alternatively, the support legs 570 can be separate components that are secured to the female contact 540 in any manner. It should be appreciated that the female contact 540 may include any number or configuration of support legs 570 for a desired application.

As shown, the end piece 550 includes a thru-hole 552 and a tapered portion 554 as described above in the previous embodiments. The illustrated end piece 550 also includes an elongated cylindrical portion that defines a bore 557 extending therethrough. The bore 557 has an inner diameter ID18, the purposes of which will be explained below. It should be appreciated that the end piece 550 can be any length or have any wall thickness for a desired application.

Assembly of the female electrical connector 520 will now be described. Initially, the body portion 542 of the female contact 540 is placed over the second outer diameter OD16 of the housing 530. As briefly described above, the body portion 542 of the female contact 540 defines an inner diameter ID17 that is slightly smaller than the second outer diameter OD16 of the housing 530. Thus, the inner diameter ID17 of the body portion 542 can be temporarily expanded by deflecting the body portion 542 and increasing the gap 546 that is located between the opposing edges. This can by accomplished engaging the inner diameter ID17 of the body portion 542 with the second outer diameter OD16 of the housing 530. The female contact 540 can be slid along the second housing portion 530B until the support legs 570 contact the shoulder 531.

The resiliency of the selected material causes the body portion 542 to spring back or otherwise contract. As a result, the inner surface of the body portion 542 frictionally engages the second outer diameter OD16 of the housing 530 and the support legs 570 engage the shoulder 531. The resultant engagement secures the female contact 540 to the housing 530 and establishes electrical continuity therebetween. It should be appreciated that the female contact 540 may also be secured to the housing 530 by an adhesive, a welding process, a threaded connection, or in any other manner.

Once the female contact 540 is secured to the housing 530, the end piece 550 can be secured over the female contact 540. For example, the inner diameter ID18 of the bore 557 defined by the end piece 550 may be configured to frictionally engage an outer surface of the body portion 542 of the female contact 540 to form a press-fit connection. In this embodiment, the support legs 570 of the female contact 540 are secured between the shoulder 531 of the housing 530 and the end piece 550. Alternatively (or in addition), the end piece 550 can be secured to the female contact 540 or to the housing 530 by an adhesive, a welded connection, a threaded connection, or in any other manner. In yet another embodiment, the end piece 550 can be formed from a non-conductive material that is over-molded to the housing 530 and the female contact 540 or otherwise secured thereto.

The principle and mode of operation of this invention have been explained and illustrated in its preferred embodiments. However, it must be understood that this invention may be practiced otherwise than as specifically explained and illustrated without departing from its spirit or scope.

What is claimed is:

1. An electrical connector comprising:
   a housing including a threaded section;
   a body portion including an internal threaded section that engages the threaded section of the housing, the body portion also including a plurality of flexible beams that each extend from the body portion; and
   an end piece disposed about the body portion and including a threaded section that engages an external threaded section of the body portion.

2. The electrical connector defined in claim 1 wherein each of the plurality of flexible beams extends from the body portion and tapers from a first width near the body portion to a second width that is smaller than the first width.

3. The electrical connector defined in claim 1 wherein the housing includes a housing portion defining a first outer diameter and the threaded section defines a second outer diameter that is smaller than the first diameter.

4. The electrical connector defined in claim 1 wherein the threaded section of the body portion defines an inner diameter that is smaller than an outer diameter of the threaded section of the housing.

5. The electrical connector defined in claim 1 wherein each of the plurality of flexible beams extends inwardly toward one another.

6. The electrical connector defined in claim 5 wherein spaces defined between adjacent ones of the plurality of flexible beams have a constant width.

7. The electrical connector defined in claim 1 wherein each of the plurality of flexible beams includes a tip portion that extends outwardly away from one another.

8. The electrical connector defined in claim 1 wherein the body portion includes a gap defined between opposing edges thereof.

9. The electrical connector defined in claim 1 wherein the end piece includes a bore defining an inner surface, and wherein the threaded section of the end piece is provided in the inner surface of the bore.

10. The electrical connector defined in claim 1 wherein the threaded section of the end piece defines an inner diameter that is smaller than an outer diameter of the threaded section of the body portion.

11. An electrical connector comprising:
    a housing;
    a body portion including a plurality of support legs that engage the housing, the body portion also including a plurality of flexible beams that each extend from the body portion, wherein each support leg includes an axially extending portion and a radially outwardly extending portion, wherein radially extending spaces are defined between the radially outwardly extending portions of adjacent support legs, and wherein axially extending spaces are defined between the axially extending portions of adjacent support legs; and
    an end piece disposed about the body portion and engaging portions of each of the plurality of support legs of the body portion.

12. The electrical connector defined in claim 11 wherein each of the plurality of flexible beams extends from the body portion and tapers from a first width near the body portion to a second width that is smaller than the first width.

13. The electrical connector defined in claim 11 wherein the housing includes a shoulder, and wherein each of the radially outwardly extending portions of the plurality of support legs engages the shoulder of the housing.

14. The electrical connector defined in claim 13 wherein the end piece engages each of the radially outwardly extending portions of the plurality of support legs.

15. The electrical connector defined in claim 11 wherein each of the plurality of flexible beams extends inwardly toward one another.

16. The electrical connector defined in claim 15 wherein spaces defined between adjacent ones of the plurality of flexible beams have a constant width.

17. The electrical connector defined in claim 11 wherein each of the plurality of flexible beams includes a tip portion that extends outwardly away from one another.

18. The electrical connector defined in claim 11 wherein the body portion includes a gap defined between opposing edges thereof.

* * * * *